United States Patent [19]
Agarwal et al.

[11] Patent Number: 5,887,183
[45] Date of Patent: Mar. 23, 1999

[54] METHOD AND SYSTEM IN A DATA PROCESSING SYSTEM FOR LOADING AND STORING VECTORS IN A PLURALITY OF MODES

[75] Inventors: Ramesh Chandra Agarwal, Yorktown Heights, N.Y.; Randall Dean Groves, Austin, Tex.; Fred G. Gustavson, Briarcliff Manor, N.Y.; Mark A. Johnson, Austin, Tex.; Terry L. Lyon, Fort Collins, Colo.; Brett Olsson, Round Rock, Tex.; James B. Shearer, Ossining, N.Y.

[73] Assignee: International Business Machines Corporation, Armonk, N.Y.

[21] Appl. No.: 368,173

[22] Filed: Jan. 4, 1995

[51] Int. Cl.⁶ .................................................. G06F 15/80
[52] U.S. Cl. ............................... 395/800.02; 395/800.17; 395/800.04
[58] Field of Search ............................. 395/800, 800.02, 395/800.14, 800.17, 800.07, 800.04

[56] References Cited

U.S. PATENT DOCUMENTS

| | | | |
|---|---|---|---|
| 4,354,249 | 10/1982 | King | 364/754.03 |
| 4,594,682 | 6/1986 | Drimak | 364/900 |
| 4,722,049 | 1/1988 | Lahti | 364/200 |
| 4,760,525 | 7/1988 | Webb | 395/800 |
| 4,777,614 | 10/1988 | Ward | 364/754.02 |
| 4,839,801 | 6/1989 | Nicely | 395/800 |
| 4,858,115 | 8/1989 | Rusterholz et al. | 364/200 |
| 4,873,630 | 10/1989 | Rusterholz et al. | 364/200 |
| 4,881,168 | 11/1989 | Inagami et al. | 364/200 |
| 4,888,679 | 12/1989 | Fossum et al. | 364/200 |
| 4,916,649 | 4/1990 | Yorozu | 364/726 |
| 4,926,317 | 5/1990 | Wallach et al. | 364/200 |
| 4,958,274 | 9/1990 | Dutton et al. | 364/200 |
| 5,032,985 | 7/1991 | Curran et al. | 364/200 |
| 5,091,848 | 2/1992 | Kojima | 395/800 |
| 5,111,389 | 5/1992 | McAuliffe et al. | 395/800 |
| 5,133,059 | 7/1992 | Ziegler et al. | 395/425 |
| 5,133,061 | 7/1992 | Melton et al. | 395/425 |
| 5,134,697 | 7/1992 | Scheffler | 395/425 |
| 5,148,536 | 9/1992 | Witek et al. | 395/425 |
| 5,179,674 | 1/1993 | Williams et al. | 395/400 |
| 5,206,822 | 4/1993 | Taylor | 364/736 |
| 5,226,171 | 7/1993 | Hall | 395/800.04 |
| 5,237,685 | 8/1993 | Toney | 395/650 |
| 5,239,660 | 8/1993 | Ooi | 395/800.02 |
| 5,265,237 | 11/1993 | Tobias et al. | 395/500 |
| 5,333,291 | 7/1994 | Grunbok | 395/425 |
| 5,544,337 | 8/1996 | Beard | 395/375 |
| 5,569,896 | 10/1996 | Marcelo | 235/70 R |

*Primary Examiner*—Eric Coleman
*Attorney, Agent, or Firm*—Anthony V.S. England; Brian F. Russell; Andrew J. Dillon

[57] ABSTRACT

A vector having a plurality of elements is stored in an input storage area, wherein the vector elements are stored in a first pattern. Thereafter, the elements are transferred, in a first order, from the input storage area into a vector register interface unit. From the vector register interface unit, the elements are transferred to an output storage area and stored in addressable locations in one of a plurality of preselected patterns. The input storage area may be implemented with cache memory or a register array. The output storage area may be implemented with a cache memory or a register array. The first pattern in the input storage area may include alternating real and imaginary elements. The plurality of preselected patterns may include a reversed order pattern, or a separation of real and imaginary elements into two vector registers.

3 Claims, 14 Drawing Sheets

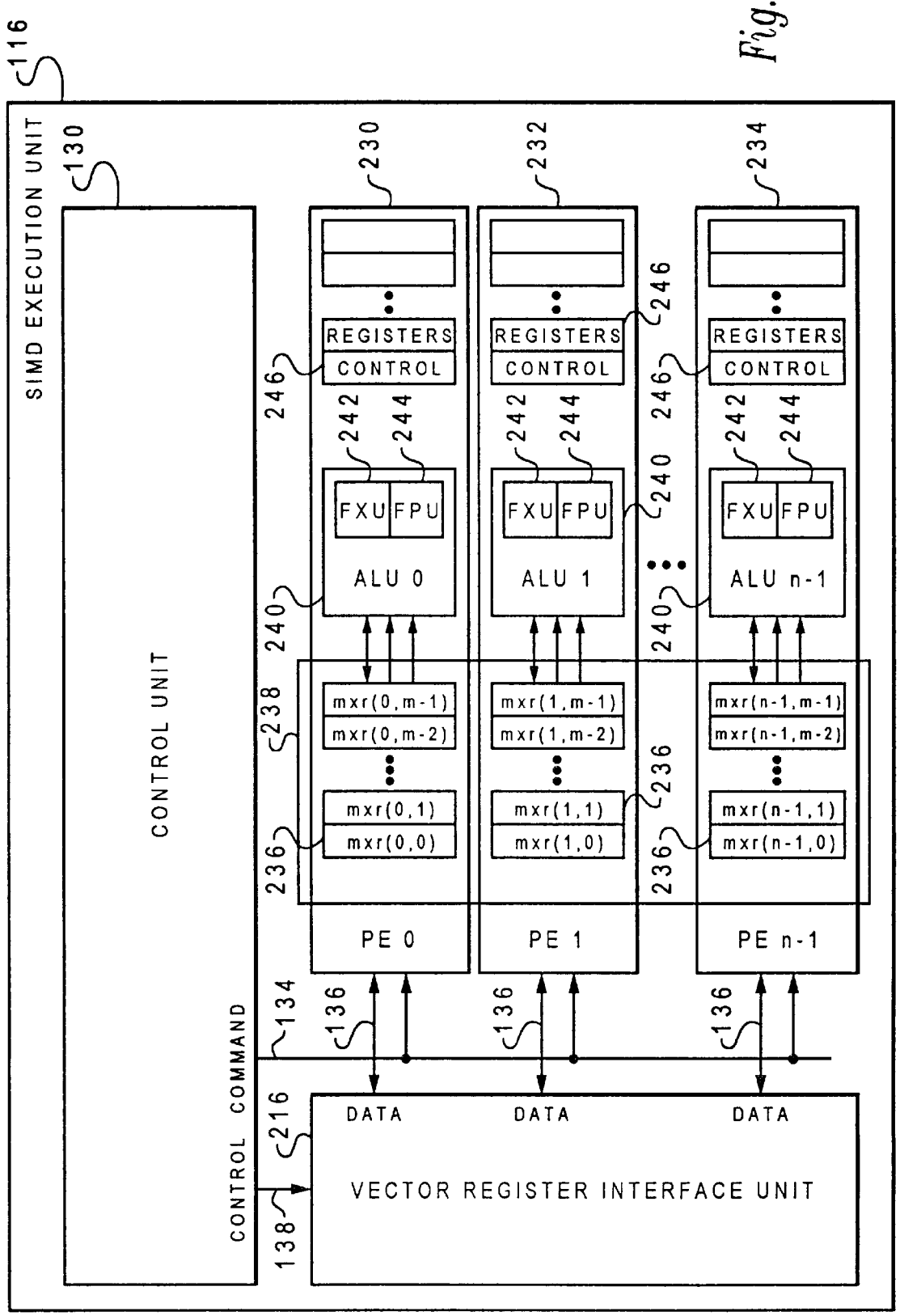

METHOD AND SYSTEM IN A DATA PROCESSING SYSTEM FOR LOADING AND STORING VECTORS IN A PLURALITY OF MODES

CROSS-REFERENCE TO RELATED APPLICATIONS

The present application is related to the following copending applications:

application Ser. No. 08/313,970, entitled "Method and System For Performing SIMD-Parallel Operations In A Superscalar Data Processing System," Attorney Docket No. AT9-94-045, filed Sep. 28, 1994;

application Ser. No. 08/313,971, entitled "Method and System For Dynamically Reconfiguring A Register File In A Vector Processor," Attorney Docket No. AT9-94-046, filed Sep. 28, 1994 now U.S. Pat. No. 5,513,366;

application Ser. No. 08/368,171, entitled "Method and System For Addressing Registers In a Data Processing Unit in an Indexed Addressing Mode," Attorney Docket No. AT9-94-094, filed of even date herewith abandoned for FWC;

application Ser. No. 08/368,172, entitled "Method and System for Vector Processing Utilizing Selected Vector Elements," Attorney Docket No. AT9-94-095, filed of even date herewith now U.S. Pat. No. 5,680,338; and application Ser. No. 08/368,176, entitled "Method And System For Addressing Registers In A Data Processing Unit In An indirect Addressing Mode," Attorney Docket No. AT9-94-165, filed of even date herewith;

all of which are assigned to the assignee herein, and incorporated herein by reference thereto.

BACKGROUND OF THE INVENTION

1. Technical Field

The present invention relates in general to an improved data processing system, and in particular to an improved vector processor. Still more particularly, the present invention relates to an improved vector processor having a vector register interface unit for loading and storing vectors in a plurality of modes.

2. Description of the Related Art

In the art of data processing system design, the speed and computational power of the data processing system have continuously increased as designers make advances in semiconductor design and manufacturing techniques, and as the architectural design of the central processing unit (CPU) is improved. One such improvement in CPU architecture is the addition of pipelining.

Pipelining increases the speed of processing a sequence of instructions by starting the execution of all instructions before the execution of all previous instructions has been completed. For example, the CPU may begin fetching an instruction from memory while another part of the CPU is decoding a previously fetched instruction. Thus, pipelining does not speed up the execution of any one instruction, but it may speed up the processing of a sequence of instructions because succeeding instructions are being processed in the CPU before the processing of prior instructions has been completed.

Another architectural improvement in CPU design is the utilization of special processor functional blocks which are optimized for rapidly performing a limited set of instructions. For example, some CPUs include functional blocks for performing only fixed-point arithmetic, or for performing only floating-point arithmetic, or for processing only branch instructions. These functional blocks which may be referred to as execution units, may perform their assigned limited functions much faster than a general purpose processor is able to perform the same function.

When the vertical parallelism achieved by pipelining is combined with the horizontal parallelism achieved by utilizing multiple execution units, the computational power of the CPU is further increased. Such a combination of vertical and horizontal parallelism permits the hardware to take a sequential instruction stream and dispatch (or issue) several instructions per clock cycle into pipelines associated with the execution units. A CPU that utilizes multiple pipelined execution units may be called a superscalar processor.

One example of such a superscalar data processing system having multiple pipelined execution units is the processor manufactured under the trademark "IBM RISC SYSTEM/6000 Model 59H" by International Business Machines Corporation (IBM) of Armonk, N.Y. Examples of execution units contained in the Model 59H include a branch execution unit, a load/store execution unit, a fixed-point execution unit, and a floating-point execution unit. The branch execution unit may be used to fetch multiple instructions from memory during a single clock cycle, and dispatch such instructions to another appropriate execution unit via an instruction dispatch bus. The load/store execution unit, which may be implemented within the fixed-point execution unit, performs address calculations and generates memory requests for instructions requiring memory access. The floating-point execution unit is optimized to receive, buffer, and execute floating-point calculations. The fixed-point execution unit may be utilized to perform integer calculations.

In many prior art CPUs, a single instruction stream directs the CPU to perform operations on a single data stream. That is, each CPU instruction performs an operation on defined data to produce one calculation per instruction. Such CPUs may be referred to as "single-instruction single-data" (SISD) processors. One problem with SISD processors may become apparent during the execution of software which performs the same operation on multiple data operands utilizing the same instruction. If the application program requires that the same CPU instruction be performed utilizing multiple data operands, the CPU may be programmed to loop through a short software segment many times. Such a software segment may be referred to as a "DO Loop". Such a DO loop performs a particular operation on multiple data operands by repeatedly recalling a particular instruction from memory in each pass through the DO loop. Such repeated recalling of a single instruction may reduce the instruction bandwidth of the CPU. Such a reduction in available instruction bandwidth means that the CPU may not be able to fetch instructions for other execution units, thereby preventing the other pipelines for other execution units to remain filled.

Another improvement in CPU architecture permits the CPU to utilize a single instruction to operate on multiple data streams, or multiple operands. Such a CPU architecture is utilized in a "single-instruction multiple-data" (SIMD) processor. In an SIMD processor, high-level operations, invoked by a single instruction, are performed on vectors. A vector is a linear array of numbers, wherein each number may be referred to as an element of the vector.

A typical vector operation might add, say, two 64-entry, floating-point vectors to obtain a single 64-entry vector. Such a vector instruction may be equivalent to an entire DO loop in which each iteration of the DO loop includes a computation of one of the 64 elements of the result, an update of the indices, and a branch back to the beginning of the DO loop. For an instructional discussion of vector processing, see chapter 7 of *Computer Architecture, A Quantative Approach*, by John L. Hennessy and David A. Patterson, published by Morgan Kaufmann Publishers, Inc. Palo Alto, Calif., pages 351–379.

Recently, the inclusion of an "SIMD execution unit" in a superscalar processor has been proposed. Such an SIMD execution unit is capable of receiving a vector instruction from the branch execution unit and performing a corresponding vector calculation. Such vector calculations include fixed- and floating-point vector calculations. Within the SIMD execution unit, multiple processing elements are coupled to a register file, or register array. Each register in the register file may store an element of a vector. The register array is configured as N rows of registers by M columns of registers, where each of the N rows is coupled to its own processing element for performing calculations and other operations using elements in the coupled row. Vector processing speed is increased by permitting each processing element to simultaneously operate on a row of registers in the register array.

Since one SIMD execution unit instruction may operate on multiple elements of a vector as directed by a single instruction, it becomes a problem to load all of the vector elements into the SIMD execution unit (i.e., the register array), and to store vector elements back to memory once vector calculations have been performed. Thus, the SIMD execution unit must load and store a vast amount of data in the form of vector elements compared to the number of instructions received by the SIMD execution unit. This may be referred to as a data bandwidth problem, as compared to an instruction bandwidth problem.

To solve such a data bandwidth problem, vector processors may recall and transfer several elements at once from memory into the vector processor. Similarly, several elements may be simultaneously stored back to memory. Typically, memory used to store such vectors is a high speed, cache-based memory system, which may provide access to several consecutive memory elements in order of increasing address in a single memory access. Such a memory access may be referred to as a "stride-1" memory access. The stride of the memory access refers to the separation between elements that are to be merged into a single vector (i.e., the address separation between two successive vector elements as those elements are stored in memory).

Loading or storing stride-1 vectors efficiently exploits the organization of the cache because consecutive memory locations are accessed in order of increasing address. Thus, vector elements may be loaded from, or stored to, a cache "line," which is a range of memory locations that may be specified with a starting address and a length. Such a cache line is the basic unit for cache memory operations.

However, the problem of interfacing memory to vector processors is not completely solved by loading or storing stride-1 vectors. In certain calculations, it may be necessary to load or store vector elements from every other memory location, in order of increasing address. Such is the case when a vector includes a real part comprised of a plurality of real elements, and an imaginary part comprised of a plurality of imaginary elements. Typically, such a vector is stored in memory with such real and imaginary elements alternating in consecutively numbered memory locations. Thus, complex vectors may be stored in memories as pairs of real and imaginary components or elements that occupy adjacent memory locations.

Vector operations on complex vectors typically require that the real and imaginary elements be placed in separate vector registers in the vector processor. This would require two stride-2 loads to load the real elements consecutive register locations in the register array and load the imaginary elements in consecutive register locations in the register array to form two vectors in two vector registers. Such stride-2 loads would not fully utilize the memory bandwidth available if such a load used a stride-1 access. Cache-based memory systems typically do not support a true stride-2 memory access because it is expensive to implement.

Other data bandwidth problems may arise during certain vector calculations which require loading or storing vector elements from memory locations that are separated in memory by n number of locations, where n is greater than one. Such a loading or storing operation may be referred to as a stride-n memory access. Loading a row of a matrix which has been stored in memory in column-major order is an important example of an operation requiring a stride-n load from memory. Column-major order means that adjacent elements in the same column of a matrix occupy adjacent memory locations in memory. Previous vector processors having cache-based memory systems have required a separate address for each vector element in a row because the elements in a row are not stored in consecutive memory locations, which means that a fast stride-1 access may not be utilized to load a row into the vector processor.

Algorithms that involve matrix operations often partition the matrices into smaller sub-matrices. These algorithms often require loading a group of adjacent rows of the sub-matrix. A typical matrix operation may use a column (or sub-column) of matrix A as a first operand and a row (or sub-row) of matrix B as a second operand. Such an operation requires that a column from a matrix be placed in one vector register and a row from the matrix placed in a second vector register so that the two vector registers may be used as source operands in a vector operation.

Loading a matrix column into a first vector register is a straight forward stride-1 memory access. However, loading a matrix row into a second vector register requires a series of stride-n memory accesses, which are typically not efficient in known cache-based vector processing systems.

Even vector processors that do not have a cache can suffer substantial performance problems with stride-n loads and stores. Systems without caches, such as some powerful supercomputers, may use a memory system that supports multiple memory accesses per cycle per processor by providing numerous memory banks that operate independently. While stride-n addressing works well for many values of n, certain values of n may lead to conflicts in the memory system when many accesses require data from the same memory bank rather than spreading accesses across many banks. Therefore, supporting stride-n vector loads and stores having the same performance as a stride-1 load and store is very desirable.

Still another memory access problem may arise during certain calculations which require loading or storing vector elements from adjacent memory locations in reverse order, or in order of decreasing address. To load elements in reverse order (relative to a stride-1 access order), previous vector processors having cache-based memory systems required a separate address for each vector element because the order of the vector elements is reversed compared to a typical stride-1 access. Therefore, supporting stride-(−1)

vector loads and stores with the same performance as stride-1 loads and stores is desirable.

SUMMARY OF THE INVENTION

It is therefore one object of the present invention to provide an improved data processing system.

It is another object of the present invention to provide an improved vector processor.

It is yet another object of the present invention to provide an improved vector processor having a vector register interface unit for loading and storing vectors in a plurality of modes.

The foregoing objects are achieved as is now described. A vector having a plurality of elements is stored in an input storage area, wherein the vector elements are stored in a first pattern. Thereafter, the elements are transferred, in a first order, from the input storage area into a vector register interface unit. From the vector register interface unit, the elements are transferred to an output storage area and stored in addressable locations in one of a plurality of preselected patterns. The input storage area may be implemented with cache memory or a register array. The output storage area may be implemented with a cache memory or a register array. The first pattern in the input storage area may include alternating real and imaginary elements. The plurality of preselected patterns may include a reversed order pattern, or a separation of real and imaginary elements into two vector registers.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 3 depicts a more detailed block diagram of a processing element in accordance with the method and system of the present invention;

DETAILED DESCRIPTION OF PREFERRED EMBODIMENT

Figure 1:
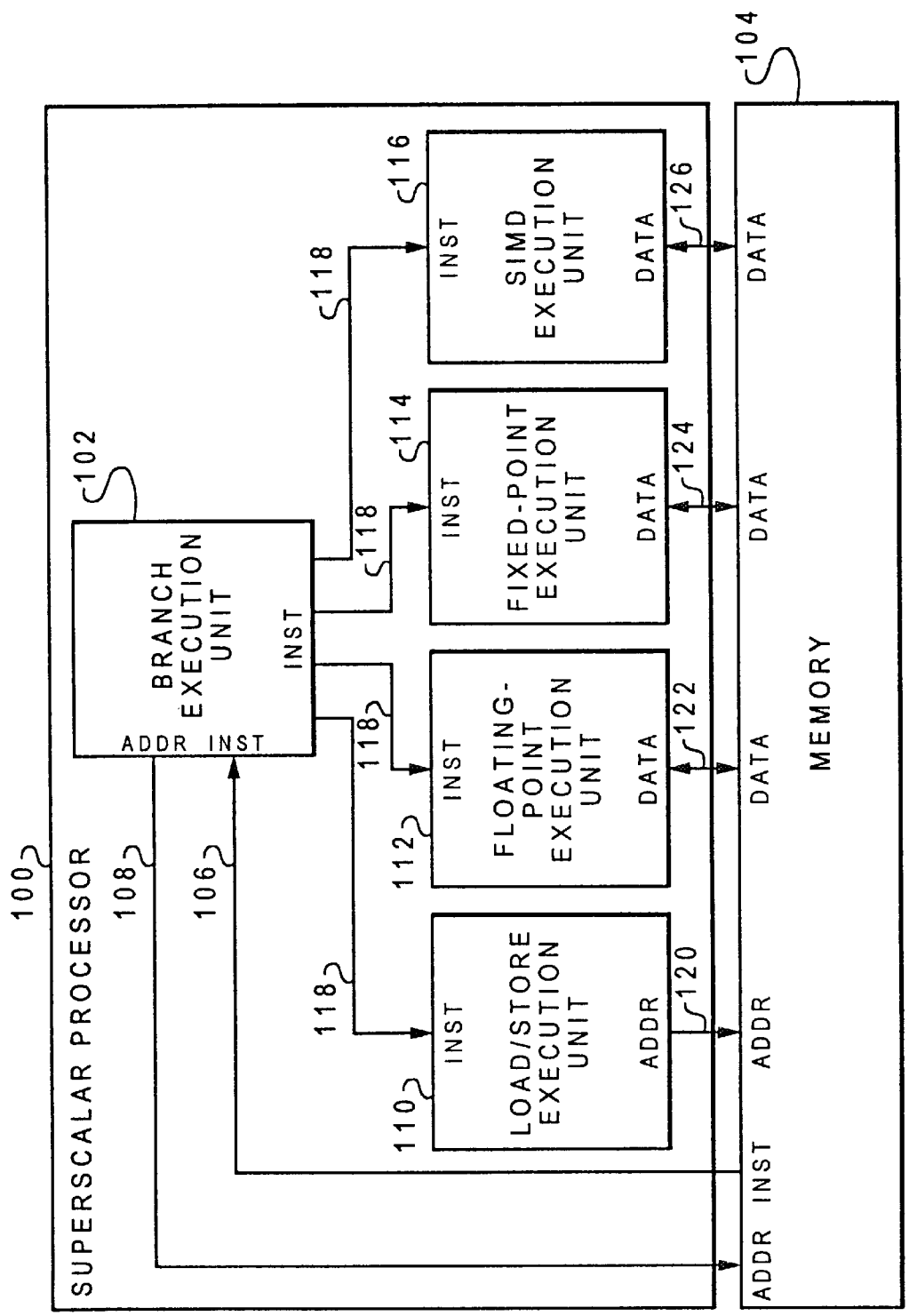
FIG. 1 depicts a high-level block diagram of a superscalar data processing system having an SIMD execution unit in accordance with the method and system of the present invention.

With reference now to the figures and in particular with reference to FIG. 1, there is depicted a high-level block diagram of a superscalar data processing system having an SIMD execution unit in accordance with the method and system of the present invention. As illustrated, superscalar data processing system 100 includes branch execution unit 102, which is coupled to memory 104 via instruction bus 106 and address bus 108. Branch execution unit 102 fetches instructions from memory 104 and dispatches such instructions to execution units 110–116 via instruction dispatch buses 118. Instruction dispatch buses may be implemented with a few buses shared by all execution units in superscalar data processing system 100, or multiple, dedicated buses for each execution unit.

Memory 104 may be implemented in different hierarchical levels of memory having different speeds and capacities. Such levels of memory may be structured such that from the viewpoint of any particular level in the hierarchy, the next lowest level is considered to be a cache. A cache memory is an auxiliary memory that provides a buffering capability by which a relatively slow and large main memory can interface to an execution unit such as branch execution unit 102 (or to a next higher level of memory) at the cycle time of such an execution unit.

In the example illustrated in FIG. 1, execution unit 116 is an SIMD execution unit, or a "vector processor" execution unit. Thus, within superscalar data processing system 100, branch execution unit 102 interfaces with SIMD execution unit 116 as another "execution class" among the variety of classes of execution units present in superscalar data processing system 100.

Other execution units within superscalar data processing system 100 may include: load/store execution unit 110, floating-point execution unit 112, and fixed-point execution unit 114. Load/store execution unit 110, which is coupled to memory 104 via bus 120, is utilized to calculate addresses and provide such addresses to memory 104 during the execution of instructions that require memory access. Load/store execution unit 110 may be utilized to provide an address to memory 104 during the execution of instructions in other execution units.

Floating-point execution unit 112, which is coupled to memory 104 via data bus 122, is utilized to perform floating-point arithmetic operations. Fixed-point execution unit 114 is coupled to memory 104 via data bus 124. SIMD execution unit 116 is coupled to memory 104 via data bus 126, which is discussed in greater detail below.

Figure 2:
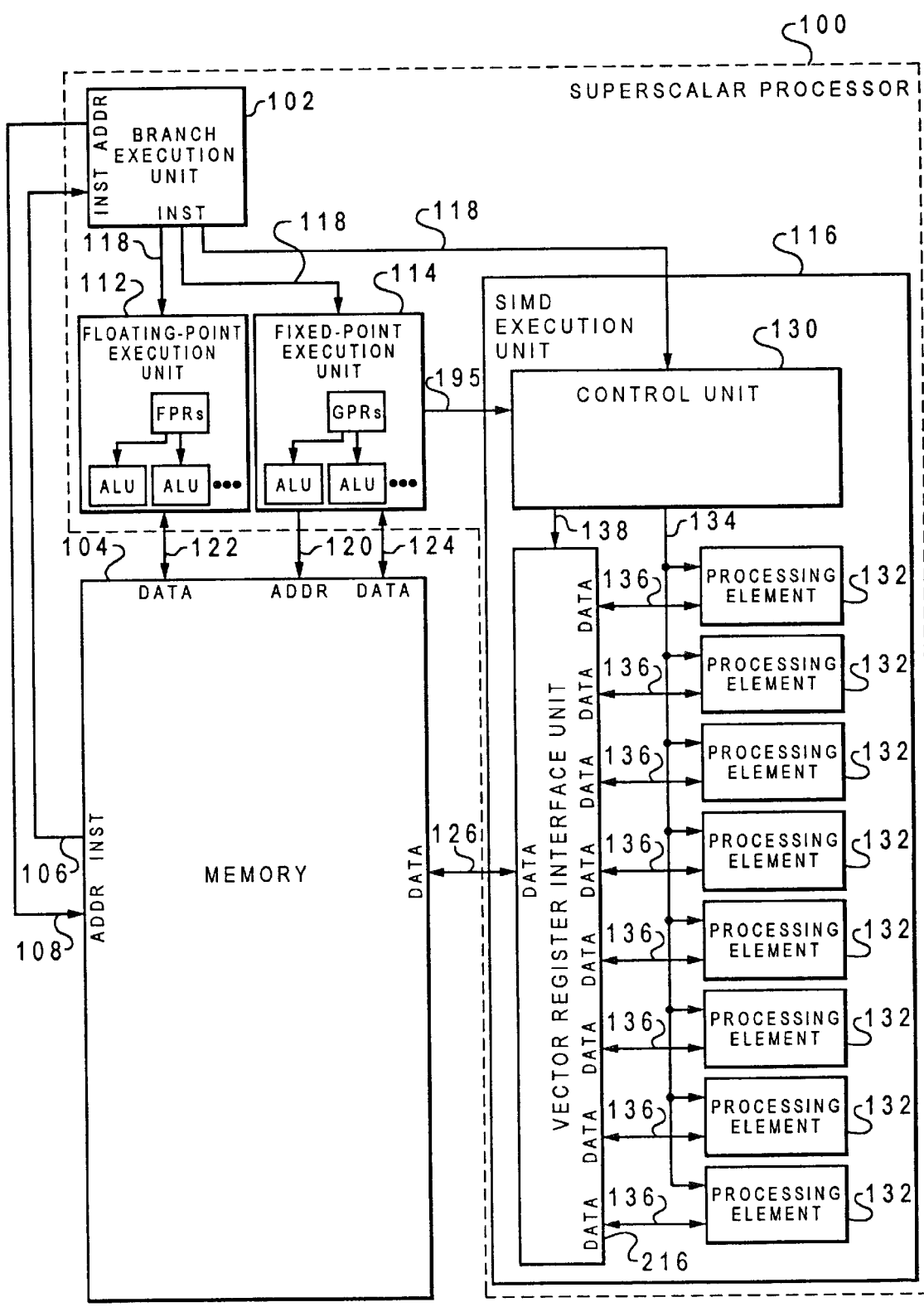
FIG. 2 is a high-level block diagram which further illustrates the components within the SIMD execution unit, and the interface between the SIMD execution unit and the superscalar data processing system in accordance with the method and system of the present invention.

With reference now to FIG. 2, there is depicted a high-level block diagram which generally illustrates the components within superscalar data processing system 100 (see FIG. 1), and more specifically illustrates components within SIMD execution unit 116 and the interface between SIMD execution unit 116 and other components in superscalar data processing system 100 in accordance with the method and system of the present invention. As illustrated, superscalar data processing system 100 includes branch execution unit 102, floating-point execution unit 112, fixed-point execution unit 114, and SIMD execution unit 116. In this example, fixed-point execution unit 114 performs the role of load/store execution unit 110, which is illustrated in FIG. 1.

Branch execution unit 102 provides address signals to memory 104 via address bus 108, and receives instructions from memory 104 via instruction bus 106. Such received instructions are then dispatched to selected execution units—including floating-point execution unit 112, fixed-point execution unit 114, and SIMD execution unit 116,—via instruction buses 118. Branch execution unit 102 dispatches instructions to an execution unit that is designated to perform the type of operation represented by the dispatched instruction. For example, an instruction representing a floating-point arithmetic operation is dispatched by branch execution unit 102 to floating-point execution unit 112.

Floating-point execution unit 112 may include a plurality of arithmetic logic units (ALUS) coupled to a group of "floating-point registers" (FPRs). Floating-point execution unit 112 is coupled to memory 104 via data bus 122. Similarly, fixed-point execution unit 114 may include a plurality of arithmetic logic units coupled to a group of "general purpose registers" (GPRs), and may be coupled to memory 104 via address bus 120 and data bus 124. Fixed-point execution unit 114 may calculate and provide addresses for all data memory accesses, thereby performing the role of load/store execution unit 110, which is illustrated in FIG. 1.

In the embodiment illustrated, SIMD execution unit 116 includes control unit 130, vector register interface unit 216, and a plurality of processing elements 132. Control unit 130 provides controls for processing elements 132 by dispatching processing element commands to selected processing elements 132 via command bus 134. Control unit 130 also provides control signals via bus 138 to vector register interface unit 216, where such control signals control the transfer of data between memory 104 and selected processing elements 132. Memory 104 is coupled to vector register interface unit 216 via data bus 126. Vector register interface unit 216 is also coupled to every processing element 132 with plurality of separate data buses 136.

In a preferred embodiment, control unit 130 includes three main functional units: (1) an instruction assembly unit, (2) an instruction expansion unit, and (3) a command dispatch unit. The instruction assembly subunit within control unit 130 provides the instruction and control interface with other execution units within superscalar data processing system 100 by receiving, buffering, and pipelining vector instructions dispatched from branch execution unit 102. Control unit 130 also receives and buffers storage access control information from fixed-point execution unit 114 transmitted on interface bus 195. Such storage access control information may include addresses calculated by fixed-point execution unit 114 and vector length information which may be used by fixed-point execution unit 114 to determine the size of a memory access.

Control unit 130 holds dispatched instructions and associated control information until branch execution unit 102 commits the instruction to complete execution. After branch execution unit 102 commits an SIMD execution unit to complete, no previously dispatched instruction can cause the SIMD execution unit instruction to abort.

An instruction queue within control unit 130 stores dispatched instructions awaiting execution. If the instruction queue is nearly full, control unit 130 notifies branch execution unit 102 that the SIMD execution unit 116 is unable to accept additional instructions. Instructions are released from the instruction queue for execution after receiving a completion signal from branch execution unit 102. Such a completion signal commits the instruction to complete. Branch execution unit 102 commits an instruction to complete after evaluating data, address, and control flow hazards that may occur because of out-of-order execution of instructions in other execution units.

The instruction expansion unit within the instruction control unit translates SIMD execution unit instructions into commands which may be dispatched to selected processing elements 132 and executed simultaneously within such selected processing elements 132 to carry out the SIMD execution unit instruction. When the instruction expansion subunit dispatches commands to several selected processing elements 132, such selected processing elements may be coordinated to provide portions of a vector which is the result of a vector calculation. For example, if a vector contains sixteen elements, eight processing elements 132 may each be utilized to execute two commands utilizing two elements as operands to produce a full sixteen-element vector result. Thus, two sets of commands are dispatched from the instruction expansion subunit to coordinate eight processing elements in operating on two elements each to produce the full sixteen-element vector result.

The command dispatch unit within the instruction control unit dispatches subsection commands (which includes processing element commands) as dispatch conditions are met. Such dispatched conditions include the detection that no register dependency collisions have occurred and the condition that all processing elements are ready to receive commands (i.e., input queues are not full). The command dispatch logic enables out-of-order execution of processing element commands generated by the instruction expansion unit. Such out-of-order execution allows parallel execution of loads or stores with execution of arithmetic operations.

In a vector load operation, when fixed-point execution unit 114 sends a sequence of requests for data to memory 104 on behalf of SIMD execution unit 116, the data requested may not be returned to SIMD execution unit 116 in the order in which the data was requested. For example, if requested data resides in cache memory (part of the hierarchical structure of memory 104), memory 104 may respond within a short period of time by sending the requested data to SIMD execution unit 116. However, if requested data is not located in the relatively fast cache memory, such requested data may be retrieved from a memory location having a relatively high latency compared with the latency of cache. This means that memory 104 sends some requested data to SIMD execution unit 116 sooner than other data.

While SIMD execution unit 116 is waiting for data from a slower memory location, other subsequently requested data may be sent to SIMD execution unit 116 before earlier requested data. To keep track of what data is received by SIMD execution unit 116 as a result of a particular memory request, memory requests are assigned an identifier, which is then later associated with the requested data recalled from memory 104. Such an identifier is then transferred with the requested data to SIMD execution unit 116. Control unit 130 tracks outstanding memory accesses utilizing these assigned identifiers. When all outstanding memory requests have been honored (i.e., data has been received for each outstanding identifier), control unit 130 initiates the transfer of the received data to the processing elements depending on the type of load instruction that was utilized to request the data.

With reference now to FIG. 3, there is depicted a more detailed representation of processing elements 132 (see FIG. 2) in accordance with the method and system of the present invention. As illustrated, a plurality of processing elements 230–234 (same as processing elements 132 in FIG. 2) are coupled to control unit 130 via common command bus 134 and individual data buses 136 coupled to each processing element 230–234.

In one embodiment of the present invention, processing elements 230–234 each include a register file 236, which may include 512 64-bit registers. Each register may be utilized to store an element in a vector and be used by an arithmetic logic unit (discussed below) to perform various operations. Together, register files 236 associated with each processing element 230–234 form a register array 238 having n sequentially numbered rows of registers and m sequentially numbered columns of registers. Thus, if register files 236 each include 512 registers, and SIMD execution unit 116 contains eight processing elements 230–234, register array 238 includes eight rows of registers and 512 columns of registers.

Vector registers, comprising a plurality of elements, are formed in the columns of register array 238. Additionally, a single vector register may be comprised of registers in more than one column, thereby permitting vector registers having a number of elements larger than n elements.

Each processing element 230–234 may also include an arithmetic logic unit 240. Such an arithmetic logic unit 240 may include both a fixed-point execution unit 242 and a floating-point execution unit 244. Preferably, both fixed- and floating-point execution units have a design similar to fixed-point execution unit 114 and floating-point execution unit 112 in superscalar processor 100 of FIG. 1. By using similar designs, the expense of designing and testing new fixed- and floating-point execution units may be saved. Arithmetic logic unit 240 utilizes operands stored in register file 236 and stores results of operations back into register file 236.

Also included within processing elements 230–234 are control registers 246. Some control registers 246 may contain status information reflecting the condition of similar registers in control unit 130. Other control registers 246 may be used during operations that require indirect addressing of registers in register file 236.

STRIDE-1 LOADS AND STORES

Figure 4A:
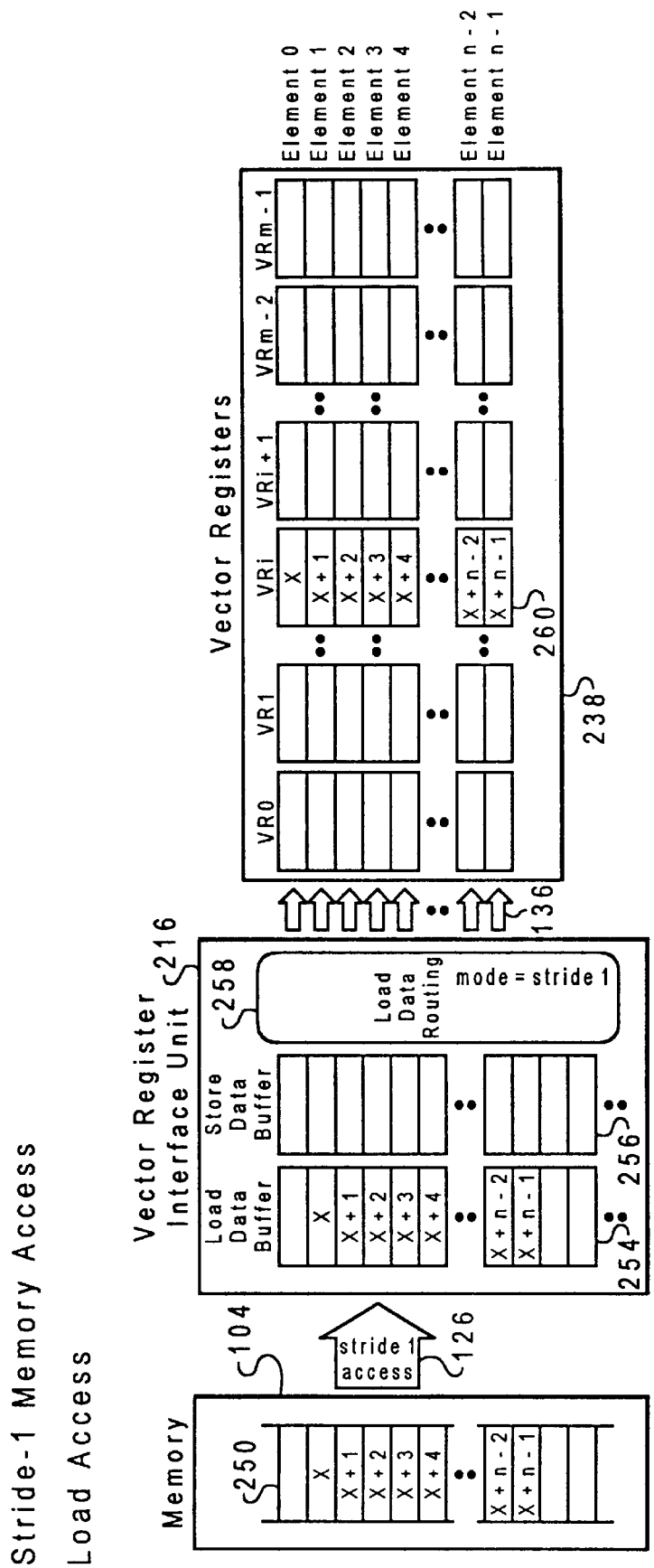
FIGS. 4A and 4B are high-level block diagrams that illustrate the process of transferring a vector between memory and a vector register in a stride-1 fashion in accordance with the method and system of the present invention.
Figure 4B:
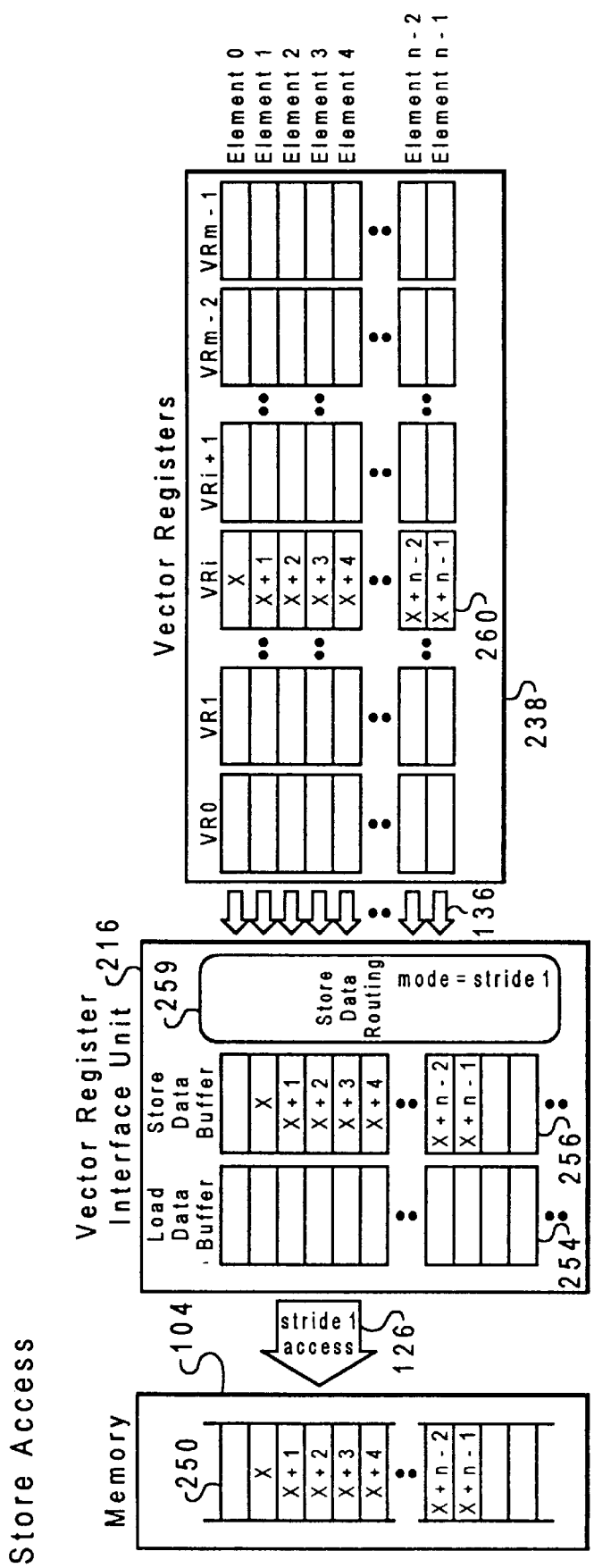

Referring now to FIGS. 4A and 4B, there are depicted high-level block diagrams illustrating the process of transferring a vector between memory and a vector register in a stride-1 fashion in accordance with the method and system of the present invention.

Referring to FIG. 4A for a stride-1 vector load operation, vector 250 is initially stored in memory 104. Elements of vector 250 are stored in sequential, adjacent addressable memory locations such that vector 250 may be efficiently recalled from memory 104 in one or more stride-1 memory accesses. Storing elements of vector 250 in sequential, adjacent addressable memory locations may be referred to as storing elements of vector 250 in a first pattern.

In a vector load operation, as elements of vector 250 are transferred from memory 104 to vector register interface unit 216, the elements are sequentially placed in load data buffer 254 in the same order, or pattern with which the elements were stored in memory 104, even if the elements are transferred to vector register interface unit 216 in a non-sequential manner.

Once all elements of vector 250 have been received by vector register interface unit 216 and placed in load data buffer 254, the elements are transferred to load data routing logic 258, which performs the required data routing to implement a specific type of load operation. In the case of a stride-1 load, data routing logic 258 may provide alignment shifting to correct for a possible unaligned address, (i.e., an address that is not a multiple of the access size of memory 104), or may provide compensation for a possible starting vector register element which is not equal to 0. For example, if the first vector register element to receive data is not element 0, then load data routing logic 258 aligns elements of the vector such that the first element is aligned to its intended target vector register element. Once data routing is complete, load data routing logic 258 forwards the align vector element to vector register 260, where the elements are each placed into sequential register locations of vector register 260. Storing vector elements in sequential locations in vector register 260 may be considered storing the vector elements in one of a plurality of selected patterns.

Referring now to FIG. 4B, the process of storing a vector in a stride-1 fashion is essentially the reverse of the stride-1 load discussed above. Vector 250 is initially located in vector register 260 in what may be considered a first pattern. The elements of vector 250 in vector register 260 are first transferred to vector register interface unit 216, where store data routing logic 259 receives the elements and aligns the elements with respect to starting processing element, memory address, and the type of store operation being performed. In a stride-1 vector store operation, store data routing logic 259 performs address and starting processing element alignment prior to placing the elements into sequential locations of store data buffer 256. Once all elements of vector 250 have been transferred from vector register 260, store data buffer 256 then transfers elements of vector 250 to memory 104 where they are placed in sequential, adjacent addressable memory locations utilizing a stride-1 memory access starting at the target memory address. Such a store operation places the elements of vector 250 in memory 104 in one of a plurality of preselected patterns.

STRIDE-(−1) LOADS AND STORES

Figure 5A:
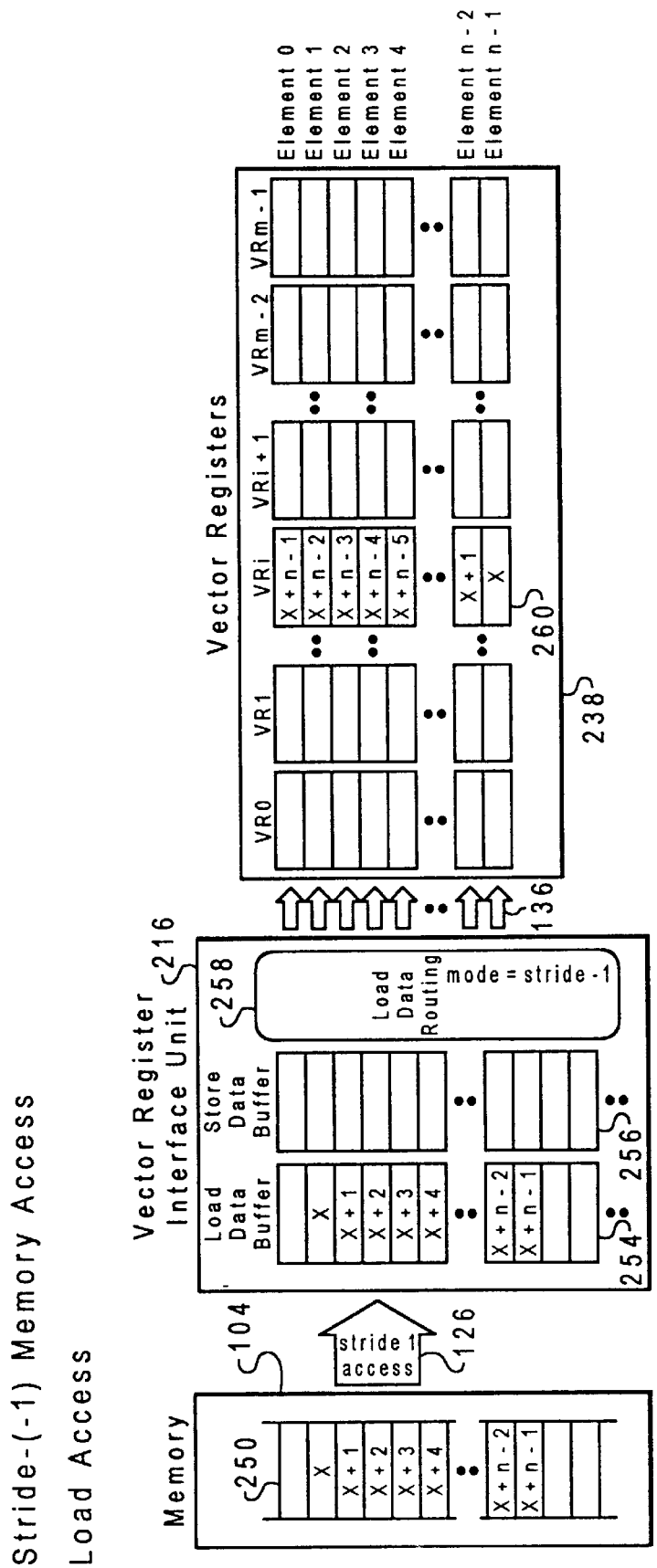
FIGS. 5A and 5B are high-level block diagrams that illustrate the process of transferring a vector between memory and a vector register in a stride-(-1) fashion in accordance with the method and system of the present invention.
Figure 5B:
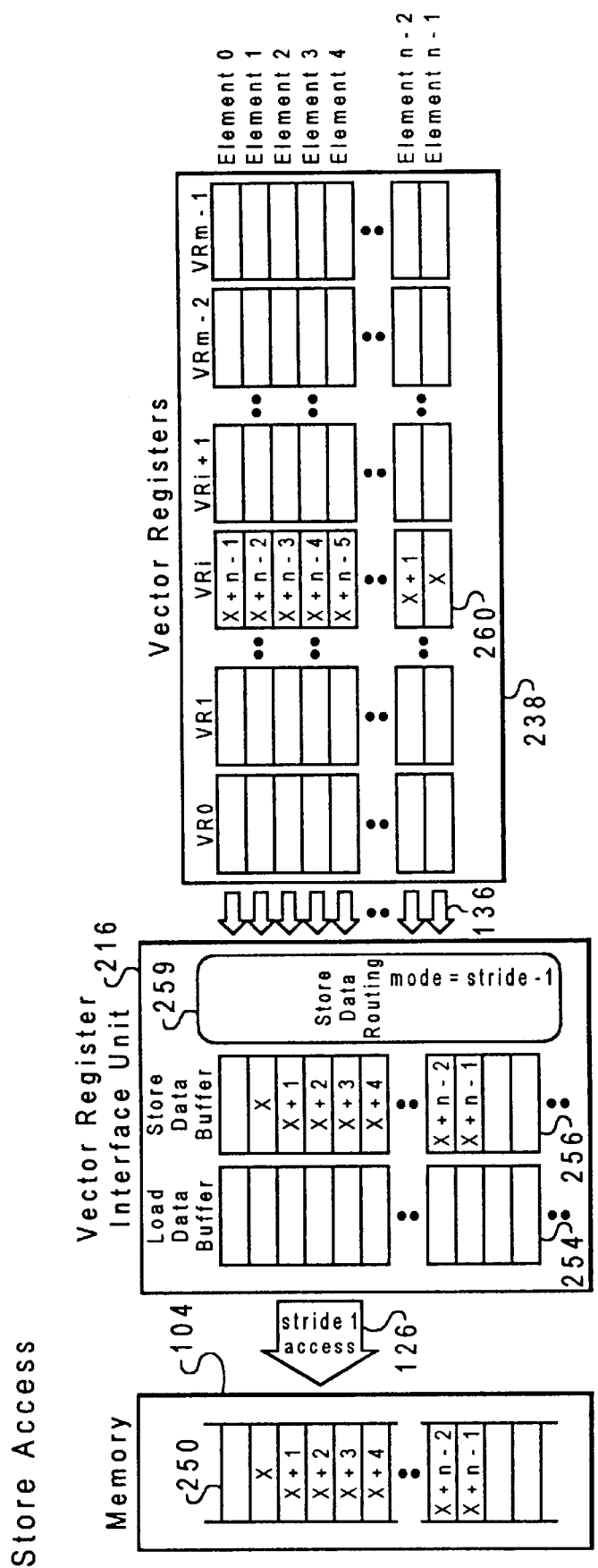

Referring now to FIGS. 5A and 5B, there are depicted high-level block diagrams which illustrate the process of transferring a vector between memory and a vector register in a stride-(−1) fashion in accordance with the method and system of the present invention.

Such a stride-(−1) vector load operation is identical to that described for the stride-1 load, as depicted in FIG. 4A, with the exception of the function performed by load data routing logic 258. Referring now to FIG. 5A for the case of the stride-(−1) load, load data routing logic 258 performs an element reversal operation, in addition to performing the functions of alignment shifting to correct for an unaligned address, or compensation for a non-0 starting vector register element. The element reversal operation is described below in greater detail with reference to FIG. 10. Storing vector elements in vector register 260 in reverse order as a result of the element reversal operation performed by load data routing logic 258 may be considered storing the vector elements in one of a plurality of preselected patterns.

Referring now to FIG. 5B, the stride-(−1) vector store operation is identical to the stride-1 store operation described with reference to FIG. 4B, with the exception of the function performed by store data routing logic 259. In the case of a stride-(−1) store, the store data routing logic 259 performs an element reversal operation on elements stored in a first pattern in vector register 260, in addition to performing the functions of alignment shifting to correct for an unaligned address, or compensation for a non-0 starting vector register element. This reversal operation will be described in greater detail below with reference to FIG. 10. Once all elements of vector 250 have been transferred from vector register 260 and placed into store data buffer 256, store data buffer 256 then transfers the elements of vector 250 to memory 104, where they are placed in sequential, adjacent addressable memory locations utilizing a stride-1 memory access starting at the target memory address. When vector elements are transferred from store data buffer 256 and stored in memory 104, such vector elements are stored in one of a plurality of preselected patterns.

STRIDE-2 LOADS AND STORES

Figure 6A:
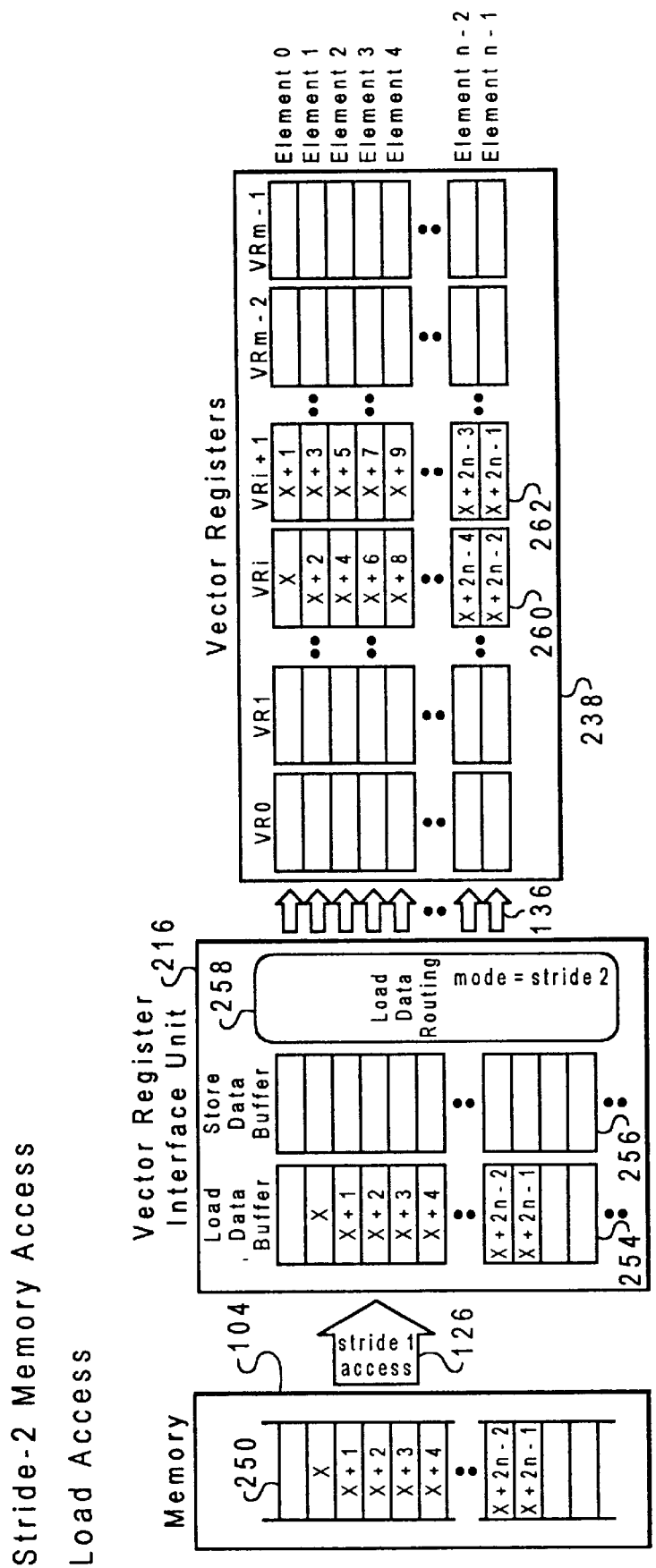
FIGS. 6A and 6B are high-level block diagrams that illustrate the process of transferring a vector between memory and a vector register in a stride-2 fashion in accordance with the method and system of the present invention.
Figure 6B:
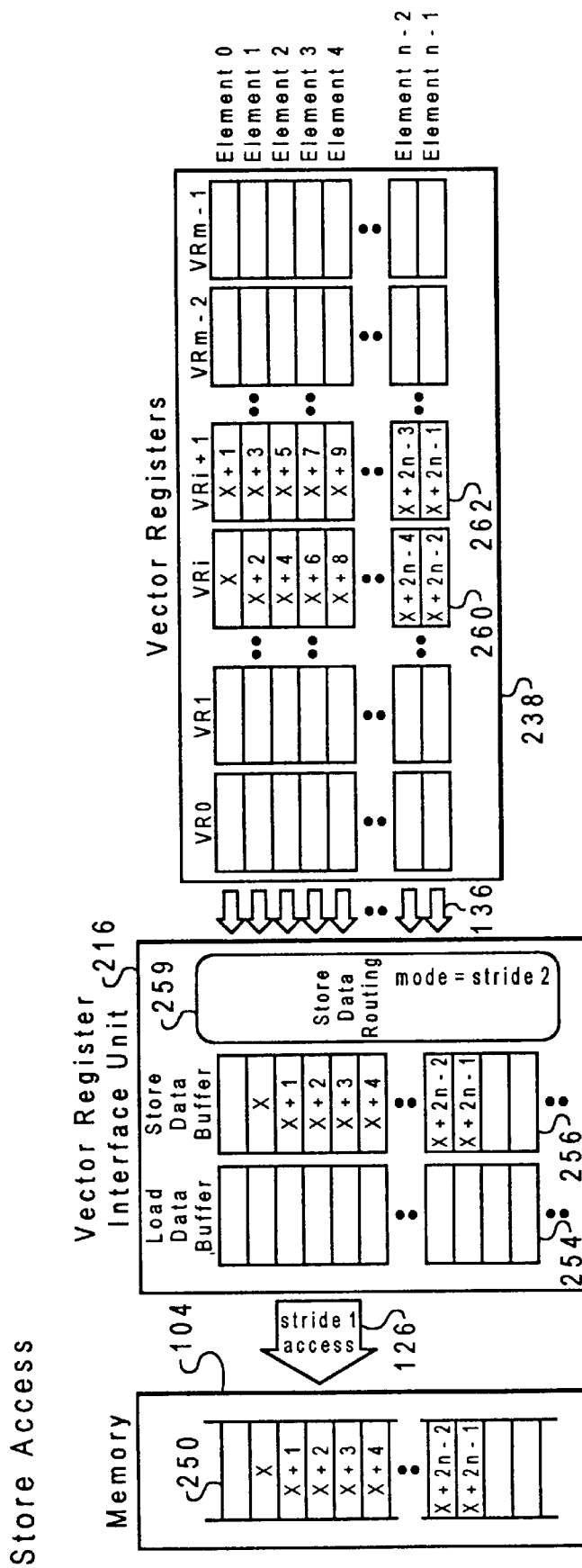

With reference now to FIGS. 6A and 6B, there are depicted high-level block diagrams illustrating the process of transferring a vector between memory and a vector register in stride-2 fashion in accordance with the method and system of the present invention.

Referring now to FIG. 6A, the stride-2 vector load operation is identical to that described for the stride-1 load operation, which is described with reference to FIG. 4A, with the exception of the function performed by load data routing logic 258. In the case of a stride-2 load, load data routing logic 258 performs an unpacking operation which separates "real" and "imaginary" elements of vector 250, in addition to performing the functions of alignment shifting to correct for unaligned addresses, or compensation for a non-0 starting vector register element. This unpacking operation is described below in greater detail with reference to FIG. 10. The stride-2 vector load operation places the real elements of vector 250 in a first vector register and the imaginary elements of vector 250 in a second vector register. In memory 104, real and imaginary elements are stored in alternating sequential, adjacent memory locations, which may be referred to as a first pattern. When elements of vector 250 are stored in vector registers 260 and 262, the elements of vector 250 are stored in one of a plurality of preselected patterns.

Referring now to FIG. 6B, the stride-2 vector store operation is identical to that described for the stride-1 operation, which is described with reference to FIG. 4B, with the exception of the function performed by store data routing logic 259. In the case of the stride-2 store, store data routing logic 259 performs a packing operation which combines "real" and "imaginary" elements, in addition to performing the functions of alignment shifting to correct for unaligned addresses, or compensation for a non-0 starting vector register element. This packing function is described in greater detail below with reference to FIG. 10. Once all elements of vector 250 have been transferred from vector registers 260 and 262 and placed into store data buffer 256, store data buffer 256 then transfers the elements of vector 250 to memory 104, where they are placed in sequential, adjacent addressable memory locations utilizing a stride-1 memory access starting at the target memory address. As illustrated in FIG. 6B, real and imaginary portions of vector 250 are stored in registers 260 and 262 in a first pattern, and after the stride-2 vector store operation, elements of vector 250 are stored in memory 104 in one of a plurality of preselected patterns.

STRIDE-N LOADS AND STORES

Figure 7A:
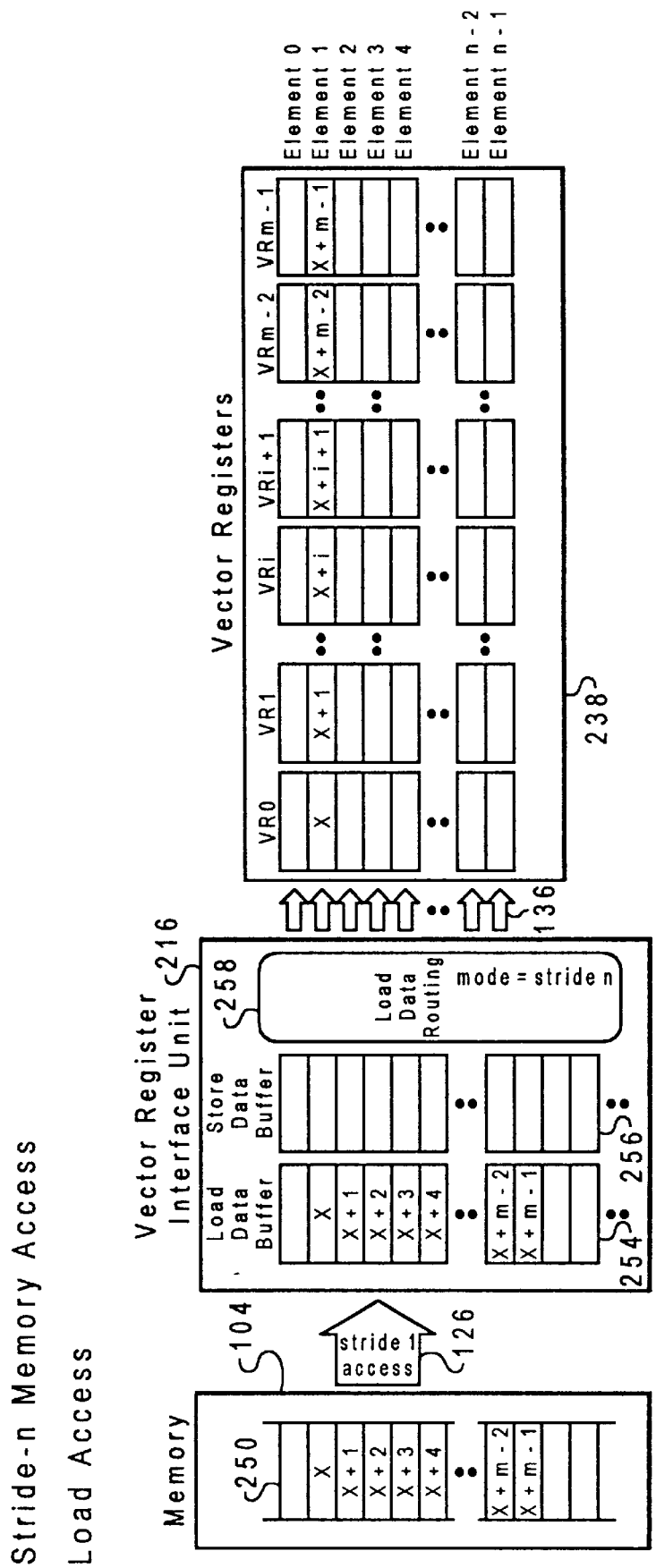
FIGS. 7A and 7B are high-level block diagrams that illustrate the process of transferring a vector between memory and a vector register in a stride-n fashion in accordance with the method and system of the present invention.
Figure 7B:
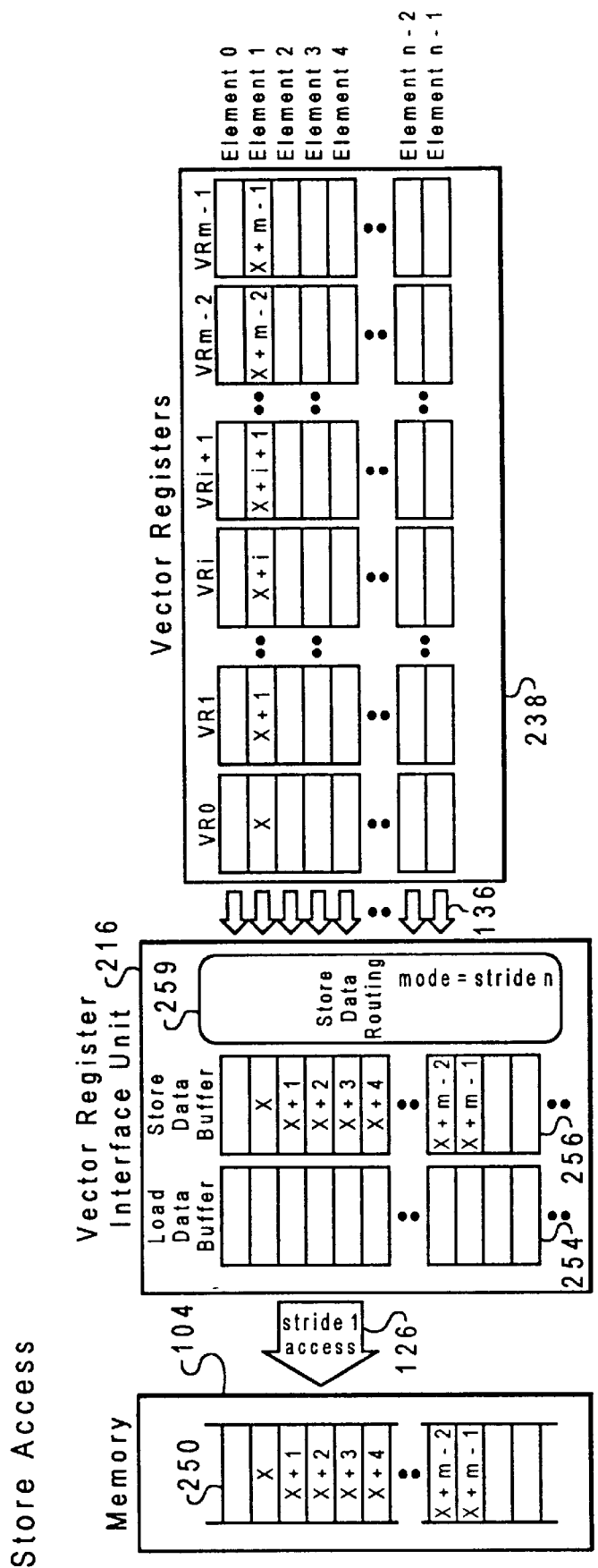

Referring now to FIGS. 7A and 7B, there are depicted high-level block diagrams which illustrate the process of transferring a vector between memory and a vector register in a stride-n fashion in accordance with the method and system of the present invention.

Referring now to FIG. 7A, a stride-n vector load operation closely resembles the stride-1 load operation described with reference to FIG. 4A, with the exception of the function performed by load data routing logic 258 and the process utilized to store vector elements in a series of vector registers in register array 238. In the stride-n vector load, load data routing logic 258 performs a transpose function, instead of broad side forwarding the data to register array 238. Such a transpose function sequentially dispatches vector elements to a specific row of register array 238. This row transpose operation will be described in greater detail below with reference to FIG. 10. Before the stride-n vector load operation, elements of vector 250 are stored in memory 104 in a first pattern, and after the stride-n vector load operation, elements of vector 250 are stored in register array 238 in one of a plurality of preselected patterns.

Referring now to FIG. 7B, a stride-n vector store operation transfers elements in sequentially numbered columns, which belong to a row of register array 238, to vector register interface unit 216, where the elements are processed by store data routing logic 259. Once all specified elements within the specified row of register array 238 have been received, the elements are transposed, aligned to correct for a possible unaligned address, and placed into store data buffer 256. From there, elements of vector 250 are transferred to memory 104, where the elements are placed into sequential, adjacent memory locations starting at a target memory address. A series of such stride-n operations may be utilized to implement true stride-n memory accesses. The row transpose operation of the stride-n operation is described in greater detail below with reference to FIG. 10. Once all elements of vector 250 have been transferred from the selected row of the register array 238 and placed into store data buffer 256, store data buffer 256 then transfers the elements of vector 250 to memory 104, where they are placed in sequential, adjacent addressable memory locations utilizing a stride-1 memory access starting at the target memory address. Before the stride-n vector store operation, elements of vector 250 are stored in register array 238 in a first pattern, and after the stride-n vector store operation, elements of vector 250 are stored in memory 104 in one of a plurality of preselected patterns.

Figure 8:
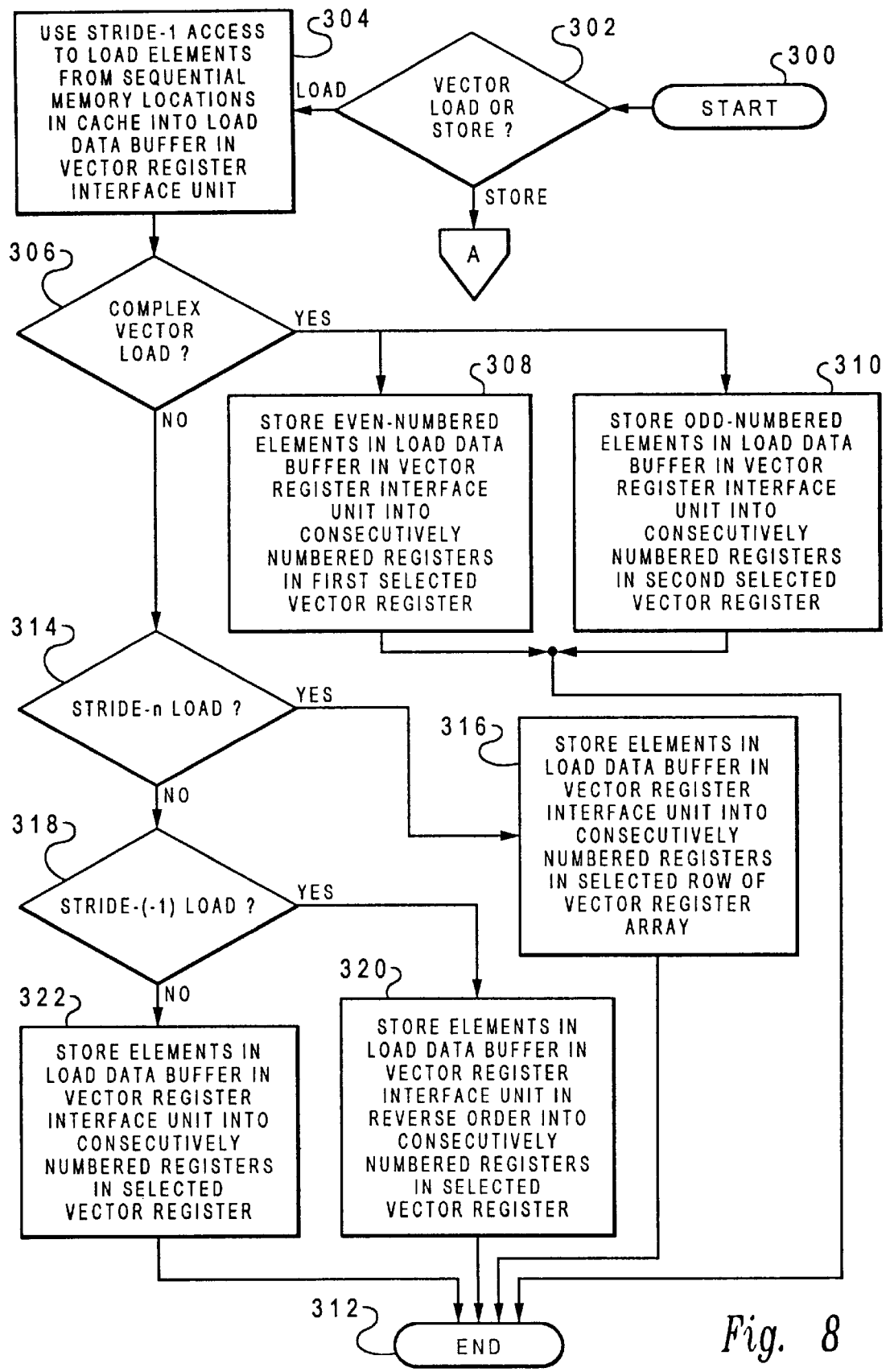
FIG. 8 is a high-level flowchart which illustrates the process of loading a vector from cache into a register array in a plurality of loading modes in accordance with the method and system of the present invention.

Referring now to FIG. 8, there is depicted a high-level flowchart which illustrates the process of loading a vector from cache into a register array in a plurality of loading modes in accordance with the method and system of the present invention. As illustrated, the process begins at block 300, and thereafter passes to block 302, which illustrates the process of determining whether a vector load is to be performed or whether a vector store is to be performed. If a vector load is to be performed, the process uses a stride-1 access to load elements from sequential, adjacent memory locations in cache (i.e., memory 104 (see FIGS. 4A–7B)) into load data buffer 254 in vector register interface unit 216 (see FIGS. 4A–7B) as depicted at block 304. In a typical load operation, an entire sector is read from cache in a stride-1 fashion. Accessing cache with a sector load maximizes the memory read bandwidth.

Next, the process determines whether or not a complex vector load operation is to be performed, as illustrated at block 306. If a complex vector load operation is to be performed, even-numbered vector elements in the load data buffer in the vector register interface unit are stored into consecutively numbered elements in a first selected vector register, as depicted at block 308, and odd-numbered vector elements in the load data buffer in the vector register interface unit are stored into consecutively numbered elements in a second selected vector register, as illustrated at block 310. Vector registers are formed from registers in register array 238 (see FIGS. 4A–7B). After the even-numbered elements and the odd-numbered elements have been stored in first and second selected vector registers, the process of loading a complex vector ends, as depicted at block 312.

Referring again to block 306, if a complex vector load operation has not been selected, the process determines whether or not a stride-n load operation has been selected, as illustrated at block 314. If a stride-n load operation has been selected, the process stores the elements in the load data buffer in the vector register interface unit in a selected row in consecutive registers in the register array, as depicted at block 316. Those persons skilled in the art should recognize that a series of stride-n vector load operations may be performed to transpose a vector matrix which has been stored in cache in column-major order.

After the vector elements are stored in a row in consecutive registers in the register array, the process of performing a stride-n load ends, as illustrated at block 312.

Referring again to block 314, if a stride-n load operation has not been selected, the process determines whether or not a stride-(−1) load operation has been selected, as depicted at block 318. If a stride-(−1) load operation has been selected, the process stores elements in the load data buffer in the vector register interface unit in reverse order, and then stores the elements into consecutively numbered elements in a selected vector register, as illustrated at block 320. After the vector elements in the load data input buffer are stored in reverse order in consecutively numbered registers in a selected vector register, the process of performing a stride-(−1) load ends, as depicted at block 312.

Referring again to block 318, if a stride-(−1) load operation has not been selected, the process performs a stride-1 load by storing elements in the load data buffer in the vector register interface unit, and then storing the elements into consecutively numbered elements in a selected vector register in the register array, as illustrated at block 322. After performing such a stride-1 load, the process ends, as depicted at block 312.

Figure 9:
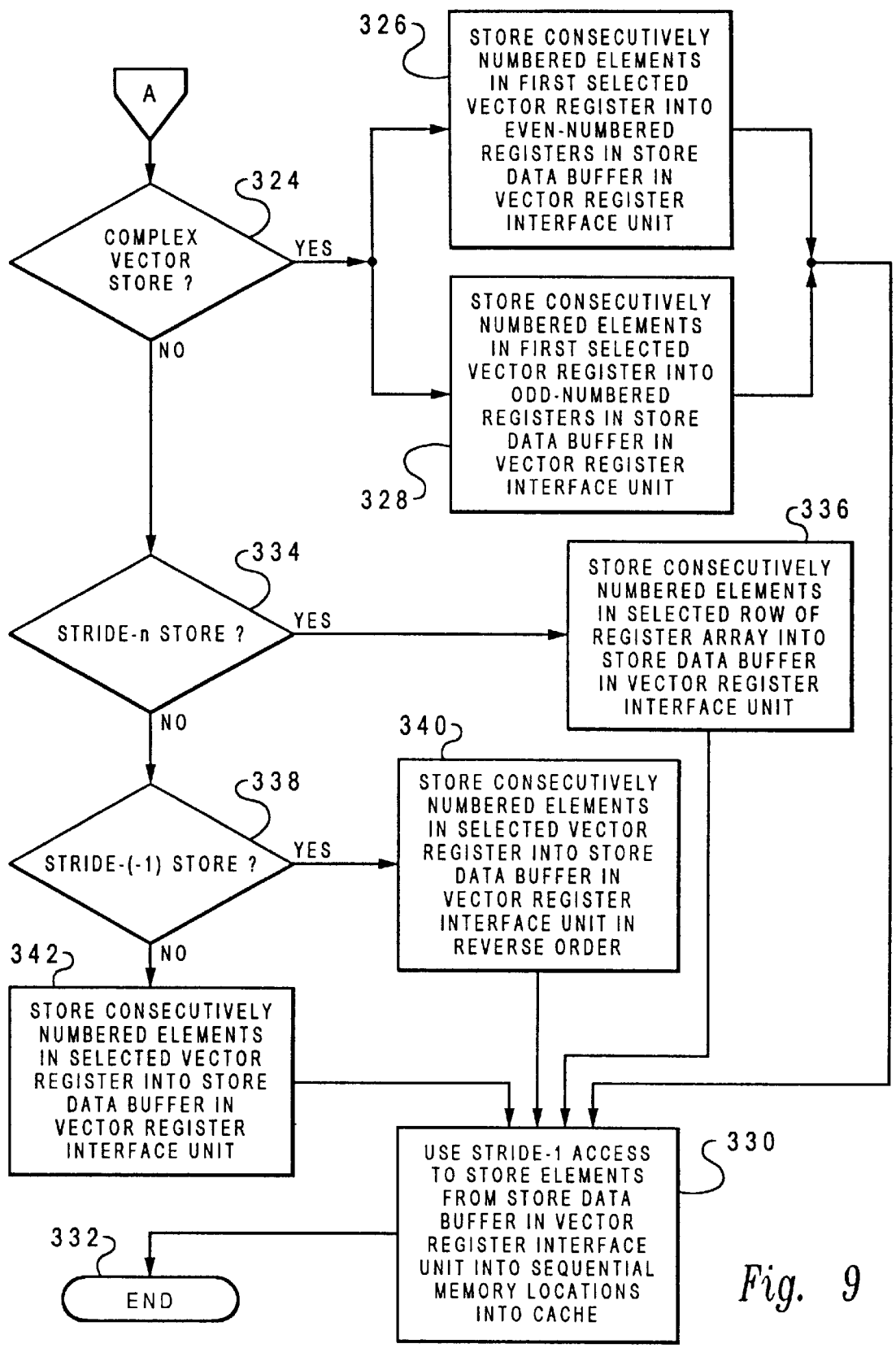
FIG. 9 is a high-level flowchart which illustrates the process of performing a vector store operation in plurality of modes in accordance with the method and system of the present invention.

With reference now to FIG. 9, there is depicted a high-level flowchart which illustrates the process of performing a vector store operation in a plurality of modes in accordance with the method and system of the present invention. As illustrated, the process begins as control is passed, via off-page connector A, from block 302 of FIG. 8, where the process has determined that a vector store operation has been selected. Once it has been determined that a vector store operation has been selected, the process determines whether or not a complex vector store operation has been selected, as illustrated at block 324. If a complex vector store operation has been selected, consecutively numbered elements in a first selected vector register are stored into even-numbered elements in a store data buffer in the vector register interface unit, as depicted at block 326. And during substantially the same period, consecutively numbered elements in a second selected vector register are stored into odd-numbered elements in the store data buffer in the vector register interface unit, as illustrated at block 328. After even- and odd-numbered elements have been stored in the store data buffer, a stride-1 access is utilized to store elements from the store data buffer in the vector register interface unit into sequential, adjacent memory locations in cache, as depicted at block 330. Thereafter, the process of storing a complex vector ends, as illustrated at block 332.

Referring again to block 324, if a complex vector store operation has not been selected, the process determines whether or not a stride-n store operation has been selected, as depicted at block 334. If a stride-n store operation has been selected, consecutively numbered elements in a selected row in the register array are stored in the store data buffer in the vector register interface unit, as illustrated at block 336. Thereafter, a stride-1 access is utilized to store elements from the store data buffer in the vector register interface unit into sequential memory locations in cache, as depicted at block 330. Thereafter, the process of performing a stride-n store operation ends, as illustrated at block 332.

Referring again to block 334, if the process determines that a stride-n store operation has not been selected, the process determines whether or not a stride-(−1) store operation has been selected, as depicted at block 338. If a stride-(−1) store operation has been selected, consecutively numbered elements in a selected vector register are stored in the store data buffer in the vector register interface unit in reverse order, as illustrated at block 340. Thereafter, a stride-1 access is utilized to store elements from the store data buffer in the vector register interface unit into sequential, adjacent memory locations in cache, as depicted at block 330. Thereafter, the process of performing a stride-(−1) store ends, as illustrated at block 332.

Referring again to block 338, if a stride-(−1) store operation has not been selected, a stride-1 store operation is performed, wherein consecutively numbered elements in a selected vector register are stored in the store data buffer in the vector register interface unit, as depicted at block 342. Thereafter, a stride-1 memory access is utilized to store elements from the store data buffer in the vector register interface unit into sequential, adjacent memory locations in cache, as depicted at block 330. The process of performing a store-1 operation then terminates, as illustrated at block 332.

Figure 10:
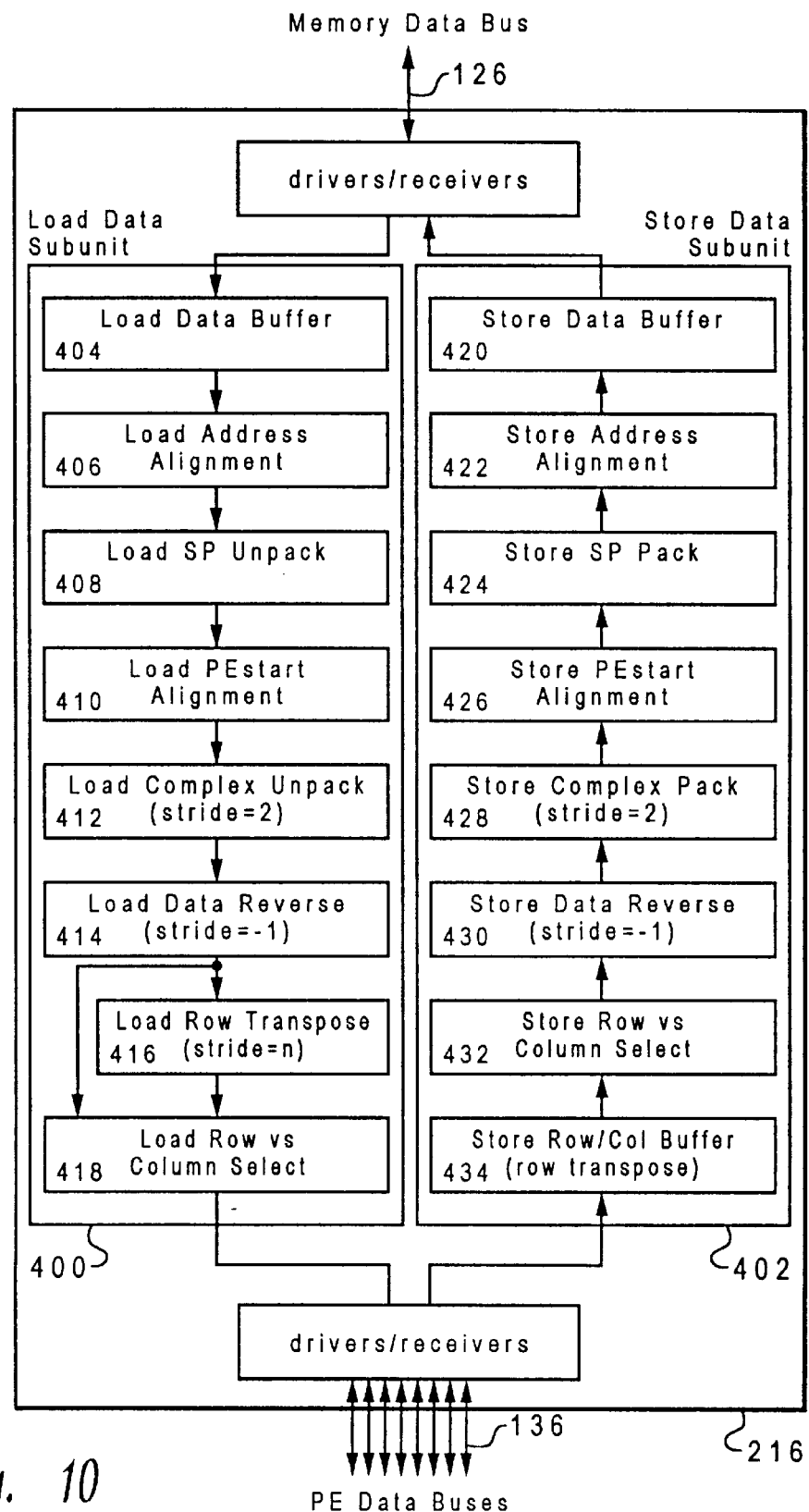
FIG. 10 depicts a high-level block diagram of a vector register interface unit in accordance with the method and system of the present invention.

Referring now to FIG. 10, there is depicted a high-level block diagram of vector register interface unit 216 in accordance with the method and system of the present invention. Vector register interface unit 216 may be comprised of two basic functional subunits: a load data subunit 400 and a store data subunit 402. Both subunits 400 and 402 share the same external data interfaces, although data is travelling in opposite directions for their respective functions.

Load data subunit 400 may be comprised of seven functional elements:

1. Load data buffer 404
2. Address alignment shifter 406

3. Single-precision unpack 408

4. PEstart alignment shifter 410

5. Complex datatype unpack 412

6. Data reverse 414

7. Row transpose 416

8. Row versus column select 418

Load data buffer 404 receives data from memory 104 via data bus 126 in a stride-1 memory access. (see FIG. 2). Data may be received out-of-order with respect to the order in which it was requested from memory. Using the unique request identifier for each memory access, load data buffer 404 can re-order any out-of-order return of data to put such data back into the original request order for subsequent processing of that data.

Memory 104 supports some minimum address granularity. In some cases it may be a byte, or a word, or, in a preferred embodiment, a 64-byte cache sector. That is, memory 104 returns properly aligned data when the address of the request is an integral multiple of this minimum address granularity. Address alignment shifter 406 is utilized when the address of the memory access is not a multiple of the minimum addressable memory access. In this case, the data is requested using a truncated address (to coerce the address into an aligned form) and the address alignment shifter 406 must shift the data by an amount equal to the amount that was truncated off the original address, and then masking off and splicing data from other accesses, if necessary, such that the final result appears as if memory 104 actually performed the access using the unaligned address.

Load single-precision unpack 408 is utilized when the format of the data being loaded is specified as single-precision (versus double-precision). In a preferred embodiment, single-precision data is 32 bits wide, as compared with 64-bit double-precision data. Since the process of loading data involves coercing elements of a vector to align with their respective target locations in the vector register, single-precision operands must be expanded so that each 32-bit element is placed at every other 32-bit location in the data flow, padding each element with 32 zeros. This action aligns 32-bit values with their 64-bit counterparts, and from this point on, the data flow can be addressed as "elements" even though only 32 bits of each "element" are significant in the case of a single-precision number. A multiplexor may be utilized to implement this expansion function, where double-precision data elements are forwarded straight through, or alternatively, consecutive single-precision elements may be selected and routed through consecutive elements locations, with zeros being forced in the low-order 32 bits.

Load PEstart alignment shifter 410 is utilized when the target of a vector load has been specified to start at an element in a vector register that is greater than zero. Once address-aligned data has been received, such data is normally be placed directly into the target vector register. Specifying a starting element other than zero forces another alignment shift operation to satisfy the requested condition. Load PEstart alignment shifter 410 is provided to perform such an alignment shift function. A simple shifter that shifts the data from 0 to N−1 element locations (where N is the number of processing elements implemented) may be utilized to implement this function.

Load complex datatype unpack 412 is utilized to unpack data that is composed of two parts—"real" and "imaginary"—and to organize the data such that "real" components are located in even-numbered elements and "imaginary" components are located in odd-numbered elements. Thus, "real" elements must be extracted and placed into consecutive element locations in a first target vector register and "imaginary" elements must be extracted and placed into consecutive element locations in a second target vector register. This operation is accomplished in two steps. First, multiplexor may be utilized to send data straight through in a bypass mode for other types of load operations or to perform the function of selecting even-numbered elements and odd-numbered elements. In a first machine cycle of the selection function, the multiplexor may select the even-numbered elements, which are then sent to a first target vector register. In a second machine cycle, the multiplexor may select the odd-numbered elements, which are then sent to a second target vector register.

Load data reverse 414 is utilized when the load operation specifies a stride-(−1) load. Part of the implementation of any load operation is to receive the data from memory and then packetize the data into packets of N elements (where N is the number of processing elements) and to forward such packets to the processing elements which will place the packets into a target vector register. For stride-(−1) vector load operations, these packets are sent to the processing elements in reverse order. Additionally, the elements within each packet must also be reversed. This reversal process may be performed by data reverse 414, which may be implemented by a multiplexor that selects one of two sets of data. The first set may be selected to support non-reverse type load operations, where data is forwarded straight through, unmodified. To support the load reverse capability, the multiplexor may be set to select the elements in reverse order. That is, the last element in a packet is routed to the first element slot, the second-to-last element in a packet is routed to the second element slot, and so forth, for all N elements. Sending the load packets in reverse order, where the elements within each load packet have been reversed, accomplishes the load reverse, or stride-(−1), operation.

Row transpose 416 is utilized to transpose a column-oriented memory access into a row-oriented write, where data is written into a set of vector registers located in the processing elements. While a normal stride-1 vector load accesses sequential elements in memory 104 and places them into consecutive locations in a single vector register, this type of load operation—a stride-n load operation—accesses those same elements in memory 104, but instead place the data into the same element location across consecutive vector registers. The normal stride-1 vector load operation receives data from memory and packetizes the data in "vertical" packets of N elements (where N is the number of processing elements) to be broadcast to the N processing elements. In a stride-n type load operation, data is instead transposed "horizontally" to then be serially dispatched to a single processing element. Since a processing element contains one or more rows of the set of vector registers, data for such a load row operation is sent to just one of the processing elements. To increase system performance, a concurrent load row operation may be supported by serially dispatching a plurality of elements to a plurality of processing elements. Such a concurrent load row operation may be executed over several cycles. Row transpose 416 may be implemented utilizing a set of buffers (one for each processing element), where each buffer has the following properties: 1) each buffer supports single-cycle loading of a plurality of elements to be dispatched to a processing element associated with the buffer, and 2) once loaded, the buffer is then able to sequence each successive data element to the associated processing element.

Row versus column select 418 is utilized to select either column-oriented load data or row-oriented load data. That is, for a load row type operation, this multiplexor selects the output of row transpose 416, and for all other types of load operations, the row versus column select 418 selects data that has not been processed by row transpose 416.

Some of the functional elements listed above are employed for all load operations, while others are utilized only for specific types of load operations. For example, single-precision unpack 408 is employed only when the data format is single-precision (or 32-bit elements), and bypassed for double-precision (or 64-bit elements).

Store data subunit 402 may also be comprised of seven similar functional elements:

1. Store data buffer 420
2. Address alignment shifter 422
3. Single-precision pack 424
4. PEstart alignment shifter 426
5. Complex datatype pack 428
6. Data reverse 430
7. Row versus column select 432
8. Store row/column buffer 434

Store row/column buffer 434 is utilized to buffer store data that has been received from the processing elements. Store data may be received out-of-order from one processing element with respect to another processing element, but data is received in-order from any single processing element. This requires some amount of independent buffering for each processing element. Thus, store row/column buffer 434 is implemented utilizing a two-dimensional register file supporting several key characteristics, including:

1. N write ports, i.e., one for each processing element data bus 136.
2. Multiple column-wise read ports to support various conditions that require access to a sufficiently large amount of the store data to enable building store packets to be sent to memory 104.
3. A row-wise read port that enables accessing multiple store data elements received from any one of the N processing elements via data buses 136.

Row versus column select 432 is utilized to select either the row-wise or column-wise accesses of store row/column buffer 434. Row-wise accesses are made to support store row (stride-n) operations. Column-wise accesses are made to support all other store operations (stride-1, stride-(−1), and stride-2).

Store data reverse 430 is utilized to support store vector reverse (i.e., stride-(−1)) operations. Similar to load data reverse 414, store data packets are generated in reverse order, and the elements within each store data packet are also reversed. A multiplexor may be utilized to support this element-wise reversal, as well as being utilized to forward data elements straight through, unmodified, to support other types of store operations.

Store complex datatype pack 428 is utilized to support store vector complex operations. Once "real" and "imaginary" vectors have been received from the processing elements, they must be packed such that consecutive "real" elements are placed in even-numbered element locations of the store data packet and consecutive "imaginary" elements are placed in odd-numbered element locations of the store data packet. A multiplexor may be employed to support this pack operation, as well as to forward data elements straight through, unmodified, to support other types of store operations.

Store PEstart alignment shifter 426 is utilized to justify store data packets with respect to the specified starting vector element, if that starting vector element is not equal to zero. A shifter that supports shifts of 0 to N−1 element positions may be utilized to support this function.

Store single-precision pack 424 is utilized to support single-precision datatypes. For single-precision data, only the upper 32 bits of the 64-bit elements received from the processing element have valid data. Single-precision store data must be compressed by discarding the unused lower 32 bits and packing the upper 32 bits of each element into consecutive 32-bit slots. Double-precision data would need to be forwarded unmodified, which means that a multiplexor may be utilized to select the packed single-precision data, or the double-precision data, which is already "packed" when it is received from the processing elements.

Store address alignment shifter 422 is utilized to accommodate addresses that are "unaligned" with respect to the minimum access granularity of the memory system. Such unaligned accesses are supported by truncating the address that is sent to the memory to the granularity that is supported by the memory, and by right-shifting the data using store address alignment shifter 422 by an amount equal to the number of bits of the address that were truncated. Store marks (or write enables) are typically supported by the memory system to support store operations that write less data than the minimum access granularity. Otherwise vector register interface unit 216 would have to request the target memory location, merge the store data into that copy, and send the modified copy back to memory (also referred to a read-modify-write operation). This has severe performance implications that are avoided with the support of store marks. While memory may not be able to align unaligned data, it may support selective write operations at a finer granularity than the normal minimum access size.

Store data buffer 420 is utilized to queue up store data before it is sent to memory. The data in this buffer has already been "aligned", and the store marks generated. This buffer is intended as a temporary holding register or set of registers for the store data until the memory system is ready to receive the store data.

Some of the functional elements listed above are employed for all store operations, while others are utilized for specific types of store operations. For example, single-precision pack 424 is utilized only when the data format is single-precision (or 32-bit elements), and bypassed for double-precision (or 64-bit elements).

While the invention has been particularly shown and described with reference to a preferred embodiment, it will be understood by those skilled in the art that various changes in form and detail may be made therein without departing from the spirit and scope of the invention.

What is claimed is:

1. A method in a vector processing system for transferring vectors having a plurality of elements between a register array having N sequentially numbered rows of addressable registers and M sequentially numbered columns of addressable registers for storing said plurality of elements and a memory having addressable storage locations, said method comprising the steps of:

storing a vector having a plurality of sequentially numbered elements in said register array, said plurality of sequentially numbered elements including both real elements and imaginary elements, wherein said real elements are stored in sequential order in a first one of said M columns and said imaginary elements are stored in sequential order in a second one of said M columns for transfer to a vector register interface unit;

in response to receipt of at least one address at said register array, transferring, in a first order, said plurality of elements from addressable registers in said register array specified by said at least one address into said vector register interface unit, said transferring step including the step of transferring, in a first order, a plurality of sequentially numbered elements from a selected one of said N rows in said register array into said vector register interface unit; and transferring said plurality of sequentially numbered elements from said vector register interface unit to said memory such that said plurality of elements are stored in said addressable locations in said memory in one of a plurality of preselected patterns, wherein said step of transferring said plurality of elements from said vector register interface unit to said memory includes the step of transferring said plurality of real and imaginary elements from said vector register interface unit to sequentially numbered locations in said memory such that said real and imaginary elements are alternately stored in said sequentially numbered locations in said memory.

2. A vector processing system, comprising:

a register array having N sequentially numbered rows of addressable registers and M sequentially numbered columns of addressable registers for storing a vector having a plurality of sequentially numbered elements including both real elements and imaginary elements, wherein said real elements are stored in sequential order in a first one of said M columns and said imaginary elements are stored in sequential order in a second one of said M columns for transfer to said vector register interface unit, wherein said register array outputs said plurality of sequentially numbered elements in response to receipt of at least one address specifying said addressable registers that store said plurality of elements;

a memory having addressable storage locations; and a vector register interface unit coupled between said register array and said memory, wherein responsive to receipt of said plurality of sequentially numbered elements from said register array, said vector register interface unit transfers, in a first order, said plurality of sequentially numbered elements into said memory such that said plurality of elements area are stored in said addressable locations of said memory in one of a plurality of preselected patterns.

3. The vector processing system of claim 2, and further comprising a vector execution unit for processing said plurality of elements forming said vector, wherein said register array is within said vector execution unit.

* * * * *

UNITED STATES PATENT AND TRADEMARK OFFICE
CERTIFICATE OF CORRECTION

PATENT NO. : 5,887,183
DATED : Mar. 23, 1999
INVENTOR(S) : *Agarwal et al.*

It is certified that error appears in the above-identified patent and that said Letters Patent is hereby corrected as shown below:

In col. 7, line 31, please change "ALUS" to -- ALUs --.

In col. 10, line 56, please change "SB" to -- 5B --.

Signed and Sealed this

Sixteenth Day of November, 1999

*Attest:*

Q. TODD DICKINSON

*Attesting Officer*  Acting Commissioner of Patents and Trademarks